(12) United States Patent
Sun et al.

(10) Patent No.: US 9,227,170 B2
(45) Date of Patent: Jan. 5, 2016

(54) SYSTEM FOR MANUFACTURING GRAPHENE NANORIBBON BY CONTINUOUS MICROWAVE

(71) Applicant: CHANG GUNG UNIVERSITY, Tao-Yuan (TW)

(72) Inventors: Chia-Liang Sun, Tao-Yuan (TW); Chun-Yi Chiu, Taoyuan County (TW)

(73) Assignee: Chang Gung University, Kwei-Shan Tao-Yuan (TW)

( * ) Notice: Subject to any disclaimer, the term of this patent is extended or adjusted under 35 U.S.C. 154(b) by 0 days.

(21) Appl. No.: 14/219,139

(22) Filed: Mar. 19, 2014

(65) Prior Publication Data

US 2015/0050193 A1  Feb. 19, 2015

(30) Foreign Application Priority Data

Aug. 19, 2013  (TW) .............................. 102129725 A

(51) Int. Cl.
*B01J 19/08* (2006.01)
*B01J 19/12* (2006.01)
*C01B 31/04* (2006.01)

(52) U.S. Cl.
CPC ........... *B01J 19/126* (2013.01); *C01B 31/0438* (2013.01)

(58) Field of Classification Search
CPC ...... B01J 19/126; B01J 37/342; B01J 19/129; B01J 2219/00164; B01J 2219/00198; B01J 2219/002; B01J 2219/0024; B01J 2219/085; C01B 31/0438; C01B 31/0446; B82Y 30/00; B82Y 40/00
See application file for complete search history.

(56) References Cited

U.S. PATENT DOCUMENTS

| 3,304,148 | A | * | 2/1967 | Gallagher ......................... 8/140 |
| 6,027,337 | A | * | 2/2000 | Rogers et al. .................... 432/64 |
| 6,372,192 | B1 | * | 4/2002 | Paulauskas et al. ......... 423/447.7 |
| 7,824,495 | B1 | * | 11/2010 | White et al. ................... 118/718 |
| 2012/0195821 | A1 | | 8/2012 | Sun et al. |

FOREIGN PATENT DOCUMENTS

JP          2012-158514 A     8/2012

* cited by examiner

*Primary Examiner* — Xiuyu Tai
(74) *Attorney, Agent, or Firm* — Rosenberg, Klein & Lee

(57) ABSTRACT

A system for manufacturing graphene nanoribbon by continuous microwave is disclosed. The system comprises a microwave heating tank for heating carbon nanotube through microwave, a reaction tank for adding an oxidizing or reducing agent and a pipeline for connecting all devices of the system. A feed rate is controlled by a pump to enter raw material into the system via the pipeline, the nanotube is made to be a graphene nanoribbon by heating, adding the oxidizing agent, reheating, adding the reducing agent and reheating. Therefore, the graphene nanoribbon could be mass produced automatically in a short time.

8 Claims, 4 Drawing Sheets

SYSTEM FOR MANUFACTURING GRAPHENE NANORIBBON BY CONTINUOUS MICROWAVE

BACKGROUND OF THE INVENTION

1. Field of the Invention

The present invention relates to a system for manufacturing graphene nanoribbon, in particular to the system for manufacturing graphene nanoribbon by continuous microwave, wherein pumps and delivery pipelines are connected and controlled to achieve the effect of mass production.

2. Description of the Related Art

As science and technology advance, components becomes increasingly smaller, so that various different novel materials and structures are developed continuously, and these materials include Fullerene, carbon nanotube (CNT), graphene and recently studied graphene nanoribbon whose special properties such as crystallinity and conductivity catch much attention.

Among the aforementioned materials, graphene nanoribbon is the thinnest and hardest nanomaterial in the world, and its unique structure is composed of carbon atoms with a sp2 hybrid orbital and packed in a honeycomb crystal lattice, and the graphene nanoribbon is a two-dimensional material with the thickness of a carbon atom. In addition, its unique properties further include almost completely transparency, high coefficient of thermal conductivity higher than those of carbon nanotubes and diamond, electron mobility exceeding the electron mobility of copper and silver at room temperature, as well as the world's smallest resistivity so far. Scientists expect that this material can be used for developing new-generation electronic components or transistors with a faster conducting speed, or used for manufacturing components such as transparent touch screens, and thus causing extensive researches.

At present, the methods of manufacturing graphene nanoribbon include silicon carbide (SiC) surface epitaxial growth method, metal surface growth method, graphite sheet oxidation thinning method, hydrazine reduction method, ethoxycarbonyl sodium lysis method and carbon nanotube cutting method. In the carbon nanotube cutting method, carbon nanotubes are dipped into sulfuric acid, and then potassium permanganate is added and heated to 65° C., wherein the oxidative capacity of potassium permanganate can open the ring of the carbon nanotube to obtain graphene nanoribbon. However, the process of manufacturing graphene nanoribbon by this method requires the step of dipping the carbon nanotubes in an acid for approximately an hour, and then adding potassium permanganate. To achieve an appropriate temperature for the ring-opening reaction of the carbon nanotube after the potassium permanganate is added, the heating process is maintained at 65° C. for more than two hours, and thus not only taking a long reaction time and consuming much energy, but also resulting in a poor yield of the graphene nanoribbon.

R.O.C. Pat. Publication No. TW 201012749 discloses a method of manufacturing graphene nanoribbon from carbon nanotube, and a composite, a thin film and a device thereof, wherein the carbon nanotubes are reacted with at least one oxidizing agent to form oxidized graphene nanoribbon, and the reaction takes place in at least one acid, and the graphene nanoribbon is heated and processed. However, this method adopts the aforementioned carbon nanotube cutting method to manufacture graphene nanoribbon and has the time-consuming, energy-consuming and low-quality issues in practical operations.

Taking the potential of developing graphene nanoribbon into consideration and recognizing the difficulty of the manufacture and mass production, it is necessary to develop or invent a novel production system. With the improved manufacturing flow and facilities, the mass production of graphene nanoribbons can be physically implemented. The graphene nanoribbon can be used more extensively with a low cost and a high efficiency. The aforementioned issues are main issues to be overcome by the present invention.

SUMMARY OF THE INVENTION

Therefore, it is a primary objective of the present invention to provide a system for manufacturing graphene nanoribbon by continuous microwave, wherein delivery pipelines are used to connect different equipments and units for manufacturing graphene nanoribbon by carbon nanotube, so that the basic conditions of mass production can be satisfied. In the meantime, pumps are installed for controlling reactants to enter into the microwave heating tank, so as to conduct a continuous mass production automatically and quickly and lower the production cost of the graphene nanoribbon.

A secondary objective of the present invention is to provide a system for manufacturing graphene nanoribbon by continuous microwave, wherein a flow channel structure required for the mass production is included in the structural design of a microwave heating tank, so that a continuous mass production of graphene nanoribbons can be achieved.

Another objective of the present invention is to provide a system for manufacturing graphene nanoribbon by continuous microwave, and the assembly of the system based on the hardware architecture allows the carbon nanotube to be fed, heated, oxidized, reheated, reduced, reheated, and received, so as to form the graphene nanoribbon after the oxidation, ring-opening and reduction processes.

A further objective of the present invention is to provide a system for manufacturing graphene nanoribbon by continuous microwave, wherein the rinsing process takes place for several times in the manufacturing process to improve the impurity of the graphene nanoribbon, so that the purity is better than that of the carbon nanotube originally serving as the raw material. In other words, the percentage of metal impurities can be reduced during the operating process of the system.

To achieve the aforementioned objectives, the present invention provides a system for manufacturing graphene nanoribbon by continuous microwave, comprising: a feeding unit, for providing a carbon nanotube material; a first pump, coupled to the feeding unit; a first microwave heating tank, coupled to the first pump, and the first pump pumping the carbon nanotube material to the first microwave heating tank to conduct microwave heating; a first reaction tank, coupled to the first microwave heating tank; a second pump, coupled to the first reaction tank; a second microwave heating tank, coupled to the second pump, and the second pump pumping the carbon nanotube material heated by the first microwave heating tank and passed through the first reaction tank to the second microwave heating tank to conduct microwave heating to form an oxidized graphene nanoribbon; a second reaction tank, coupled to the second microwave heating tank; a third pump, coupled to the second reaction tank; a third microwave heating tank, coupled to the third pump, and the third pump pumping the oxidized graphene nanoribbon heated by the second microwave heating tank and passed through the second reaction tank to the third microwave heating tank to conduct microwave heating to form a graphene nanoribbon; and a material receiving unit, coupled to the third microwave heating tank, for winding the graphene nanoribbon; wherein the connection methods are through a plurality of delivery pipelines. With the design and arrangement of this structure or the function of the pump, a single microwave heating tank can be used. In other words, the pump pumps the carbon nanotube material with the oxidizing agent and the reducing agent from the reaction tank to the first microwave heating tank to conduct microwave heating and achieve the mass production effect of the graphene nanoribbons.

DETAILED DESCRIPTION OF THE PREFERRED EMBODIMENTS

The present invention will become clearer in light of the following detailed description of an illustrative embodiment of this invention described in connection with the drawings. It is intended that the embodiments and drawings disclosed herein are to be considered illustrative rather than restrictive.

Figure 1:
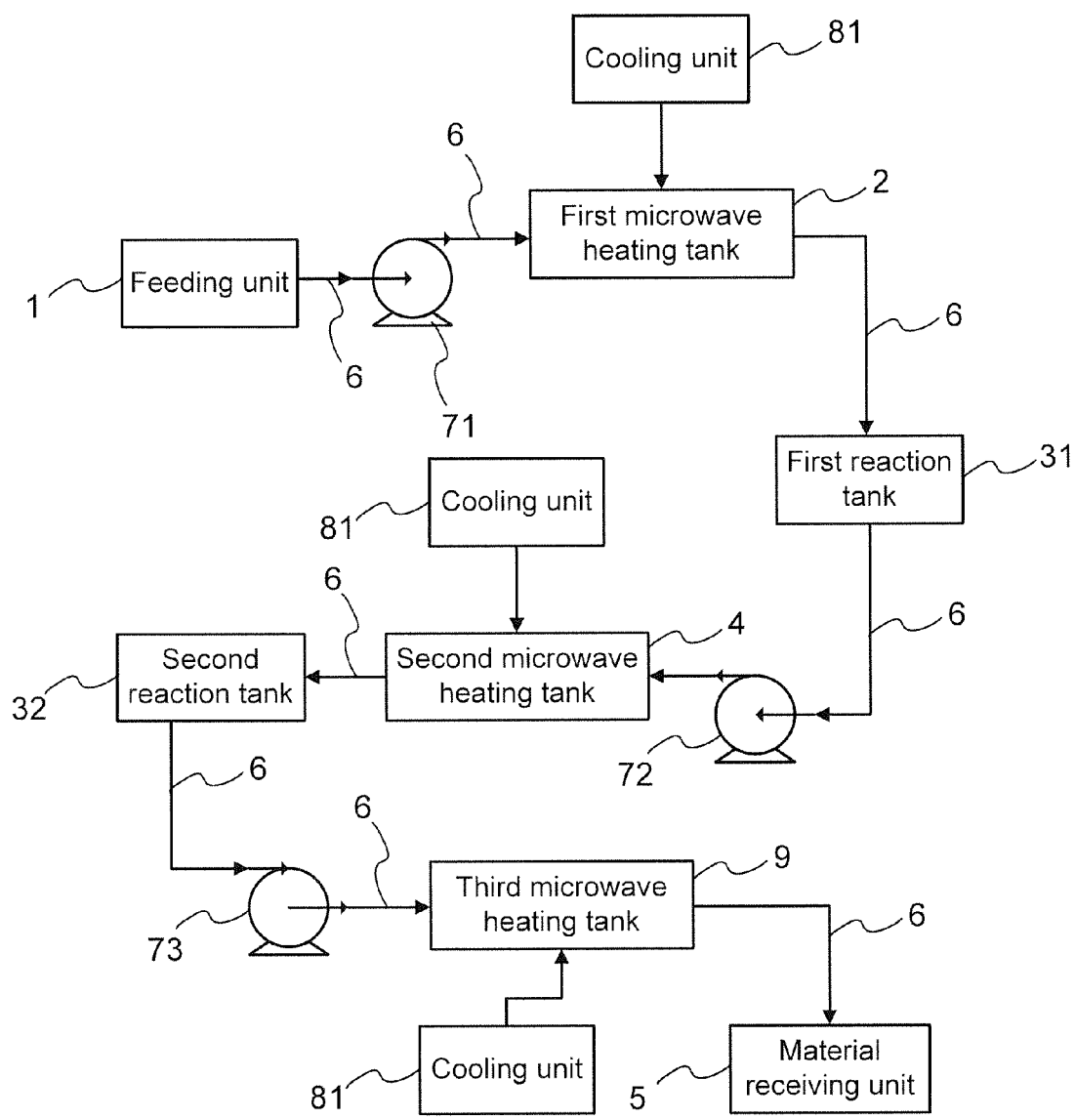
FIG. 1 is a schematic view of a system of a preferred embodiment of the present invention.

With reference to FIG. 1 for a schematic view of system for manufacturing graphene nanoribbon by continuous microwave in accordance with the present invention, the system comprises: a feeding unit 1, a first microwave heating tank 2, a first reaction tank 31, a second reaction tank 32, a second microwave heating tank 4, a third microwave heating tank 9 and a material receiving unit 5. Wherein, the first microwave heating tank 2 is coupled to the feeding unit 1; the first reaction tank 31 is coupled to the first microwave heating tank 2; the second microwave heating tank 4 is coupled to the first reaction tank 31; the second reaction tank 32 is coupled to the second microwave heating tank 4; the third microwave heating tank 9 is coupled to the second reaction tank 32; and the material receiving unit 5 is coupled to the third microwave heating tank 9.

Besides the aforementioned feeding, heating, and material receiving devices or units used in the production line, the present invention further comprises a first pump 71, a second pump 72 and a third pump 73 of the same specification to facilitate the delivery operation, flow control and productivity improvement. Wherein, the first pump 71 is installed between the feeding unit 1 and the first microwave heating tank 2, so that the two are coupled to each other; the second pump 72 is installed between the first reaction tank 31 and the second microwave heating tank 4, so that the two are coupled to each other; and the third pump 73 is installed between the second reaction tank 32 and the third microwave heating tank 9, so that the two are coupled to each other. In addition, the first microwave heating tank 2 and the second microwave heating tank 4 are coupled to a cooling unit 81 separately.

In addition, the present invention serves as a manufacturing equipment of graphene nanoribbons, and the devices or units in the system are connected by delivery pipelines 6 for moving and transmitting raw materials, semi-finished goods, and finished goods.

In the system for manufacturing graphene nanoribbon by continuous microwave in accordance with the present invention, the feeding unit 1 has the function of supplying the carbon nanotube material into the first microwave heating tank 2 to conduct microwave heating, and the carbon nanotube material is composed of a plurality of carbon nanotubes and an acidic solution. The acidic solution can be phosphoric acid ($H_3PO_4$), sulfuric acid ($H_2SO_4$), hydrochloric acid (HCl), nitric acid ($HNO_3$) or any combination of the above. The acidic solution has a pH value preferably falling within a range of 3~4, since an insufficient acidity may affect the reactivity of the subsequent surface functionalization of the carbon nanotube. However, if the pH value of the acidic solution is too low, then the structure of the carbon nanotube may be damaged easily when the subsequent functionalized reaction takes place. As a result, the structure of the obtained carbon nanotube is incomplete, which will affect the graphene nanoribbon so produced.

The first pump 71 is installed between the feeding unit 1 and the first microwave heating tank 2 and capable of controlling the speed of entering the carbon nanotube material into the first microwave heating tank 2, and the flow rate has a range of 0.1~500 ml/min. After the carbon nanotube material is pumped into the first microwave heating tank 2, the first microwave heating tank 2 conducts a microwave heating process of the carbon nanotube by a microwave power of 150 W~250 W.

At this stage, the microwave heating method is used to conduct a functional group grafting reaction at the surface of the carbon nanotube to obtain a surface modified carbon nanotube. Since the carbon nanotube without surface modification may be aggregated seriously in water solution that will affect the yield of forming graphene nanoribbon, therefore the surface modification of carbon nanotubes and the improved dispersibility of carbon nanotubes in the acidic solution are conducive to the improved reactivity and yield of the graphene nanoribbon. With the microwave processing of the first microwave heating tank 2, the carbon nanotube features the property of absorbing microwave energy easily, and this microwave heating method can generate resonance of molecules at the surface of the carbon nanotube to rearrange the combination. Compared with the traditional method of heating the carbon nanotube by convection in order to conduct surface modification, the present invention employs the microwave heating method, and thus not just achieving a faster speed only, but also reducing the reaction time required by the traditional heating method, and avoiding the issue of damaging the structure of the carbon nanotube.

Figure 2A:
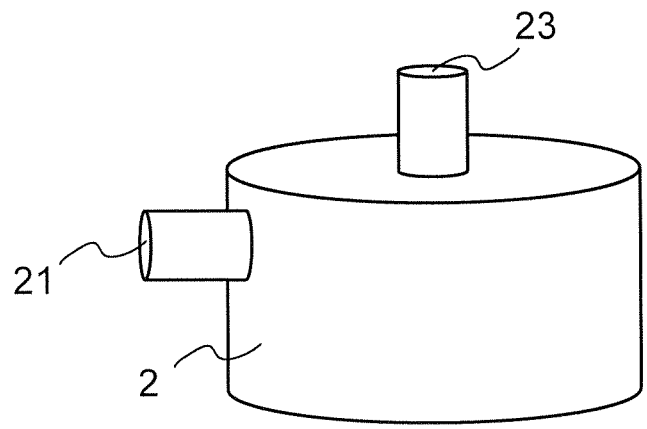
FIG. 2A is a schematic view of a microwave heating tank used in the present invention.
Figure 2B:
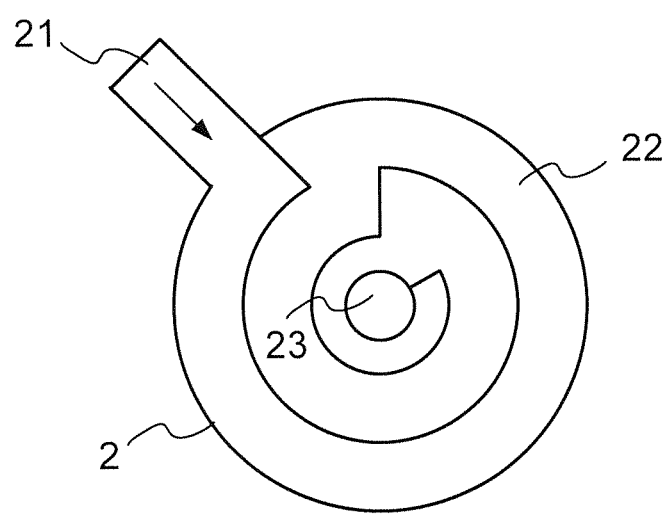
FIG. 2B is a top view of the internal structure of a microwave heating tank used in the present invention.

In the first microwave heating tank 2 used in the present invention, a reaction temperature of 1~120° C., and a reaction power of 1~3000 W are required. With reference to FIGS. 2A and 2B for the structure of the first microwave heating tank 2, the first microwave heating tank 2 comprises a feed inlet 21, a flow channel 22 and a material outlet 23. A preferred embodiment of the flow channel 22 is illustrated in the figure. However, the flow channel 22 is not limited to this embodiment only, but any flow channel capable of providing a good flow of the carbon nanotube material in the first microwave heating tank 2 by the kinetic power of an external pump can be used.

In addition to the microwave power of 150 W~250 W used to conduct the microwave processing of the carbon nanotube in the first microwave heating tank 2, the microwave time preferably falls within a range of 2~5 minutes. If the microwave power is too high or the microwave time is too long, the structure of the carbon nanotube may be damaged easily in the reaction process. If the microwave power is too low or the microwave time is too short, the modification of the functional group at the surface of the carbon nanotube will be insufficient, so that the improvement of dispersibility of the carbon nanotube will be limited.

The first reaction tank 31 is a relay point in the reaction process of the system of the present invention, and the first reaction tank 31 is used for adding an oxidizing agent, wherein the oxidizing agent can be potassium chlorate ($KClO_3$), sodium chlorate ($NaClO_3$), potassium perchlorate ($KClO_4$), hydrogen peroxide ($H_2O_2$), potassium permanganate ($KMnO_4$) or any combination of the above. This reaction tank allows molecules of an oxidizing agent to be contacted uniformly with the surface of the carbon nanotube.

The oxidizing agent is provided for forming C—C double bonds at the surface of the oxidized carbon nanotube, and the original complete ring structure of the carbon nanotube is damaged in the oxidation process, so that the bonds of the carbon nanotube along the long axis direction are broken (which is known as ring-opening), so as to obtain the two-dimensional oxidized graphene nanoribbon. Now, if the oxidizing agent added into the reaction tank 3 is insufficient, the ring-opening reaction of the carbon nanotube cannot be completed, and the yield and purity of the oxidized graphene nanoribbon will be reduced. Therefore, the weight ratio of the oxidizing agent to the carbon nanotube in this preferred embodiment cannot be less than 2, and the weight ratio of the oxidizing agent to the carbon nanotube cannot be less than 5.

The installation of the first reaction tank 31 is simply provided for adding the oxidizing agent, and a reactant added with the oxidizing agent is entered into the second microwave heating tank 4 by the second pump 72. The second microwave heating tank 4 is the same as the second microwave heating tank 1 with a structure comprising a feed inlet, a flow channel and a material outlet, wherein the reaction fluids are filled in by a microwave method to conduct heating. Now, microwave energy can be further absorbed by an oxidation of the carbon nanotube conducted by the oxidizing agent, so that the resonance and bond breaking of the C—C double bonds at the surface of the carbon nanotube occur to break the bonds of the carbon nanotube in a direction along the extended axis to form the oxidized graphene nanoribbon.

When the second microwave heating tank 4 is operated, if the wattage of microwave is too low, then the supplied energy may not be enough within a fixed time, and the temperature rising speed will not be fast enough, and the reaction will be incomplete. On the other hand, if the wattage of microwave is too high, energy supplied instantaneously may be too high, the temperature change may be too severe, the manufacturing time may not be controlled easily, the reaction result may be affected, and/or the safety issue may arise. Therefore, the control parameters of the microwave power of the second microwave heating tank 4 preferably include a reaction temperature of 60~802, a reaction power of 150~200 W, and a microwave time not greater than 5 minutes.

Up to this stage, the oxidized graphene nanoribbon is formed from the carbon nanotube material. However, the electrical and thermal conductivities of the oxidized graphene nanoribbon are poor and the application is limited, so that dimethyl acetamide serving as a reducing agent is added into the second reaction tank 32 to produce a semi-finished goods which is entered into the third microwave heating tank 9 to conduct a microwave heating process by the pumping and flow control of the third pump 73. The third microwave heating tank 9 has a same specification as those of the first microwave heating tank 2 and the second microwave heating tank 4.

After the microwave heating process is completed in the third microwave heating tank 9, the produced graphene nanoribbon is delivered to the material receiving unit 5, and the material receiving unit 5 can wind the product and provide a baking function of drying the product.

The aforementioned structure resides on the main path of converting carbon nanotube into graphene nanoribbon, and the cooling unit 81 is an object attached to the main body. The cooling unit 81 of the present invention is coupled to the first microwave heating tank 2 and the second microwave heating tank 4 separately and used for controlling the reaction temperature of the first microwave heating tank 2, the second microwave heating tank 4 and the third microwave heating tank 9 to prevent the aforementioned problems that may affect the production efficiency caused by inappropriate temperature control of the microwave heating process during the production process of the graphene nanoribbon.

Figure 3:
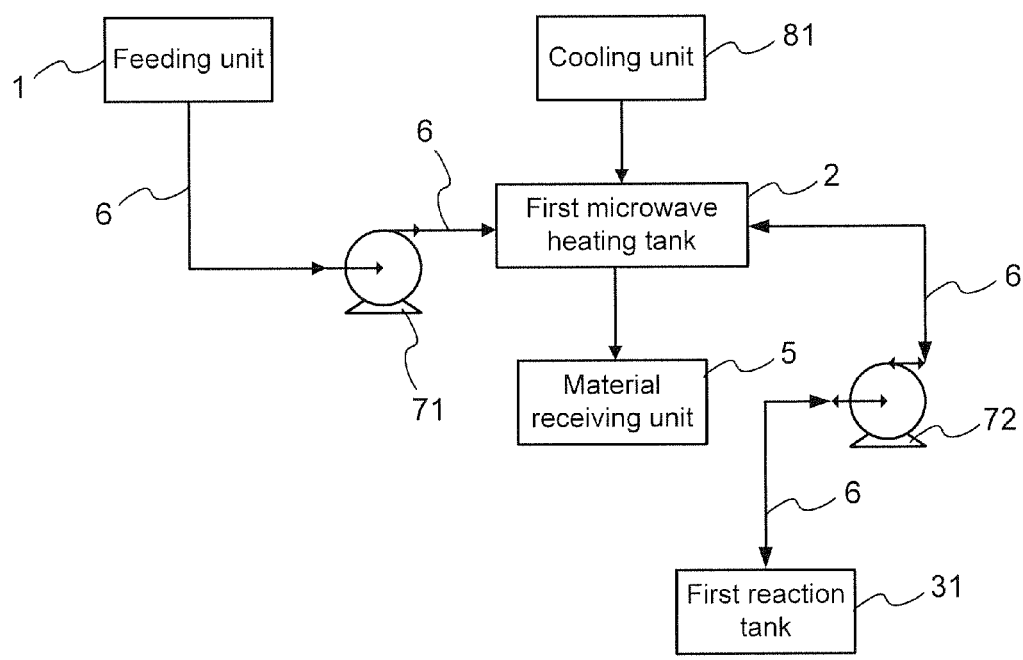
FIG. 3 is a schematic view of a system of another preferred embodiment of the present invention.

With reference to FIG. 3 for another preferred embodiment of the present invention, the system just installs the first microwave heating tank 2 only without the installation of the second microwave heating tank 4 and the third microwave heating tank 9, and such arrangement can be regarded as the first microwave heating tank 1, the second microwave heating tank 4 and the third microwave heating tank 9 being the same tank. In this preferred embodiment of the present invention, the carbon nanotube material is pumped into first microwave heating tank 1 by the first pump 71 and then entered into the first reaction tank 31 after the microwave heating takes place, and an oxidizing agent is added, and then the semi-finished good is pumped by the second pump 72 back into the first microwave heating tank 1 to conduct microwave heating, and then entered into the first reaction tank 31, and pumped by the second pump 72 back into the first microwave heating tank 1 to conduct microwave heating. Finally, the material receiving unit 5 winds the graphene nanoribbon product. This preferred embodiment of the invention is characterized in that the first microwave heating tank 1 is used repeatedly to conduct microwave heating, so as to achieve the effects of simplifying the structure of the system, reducing the complexity of installation, and lowering the cost.

Figure 4:
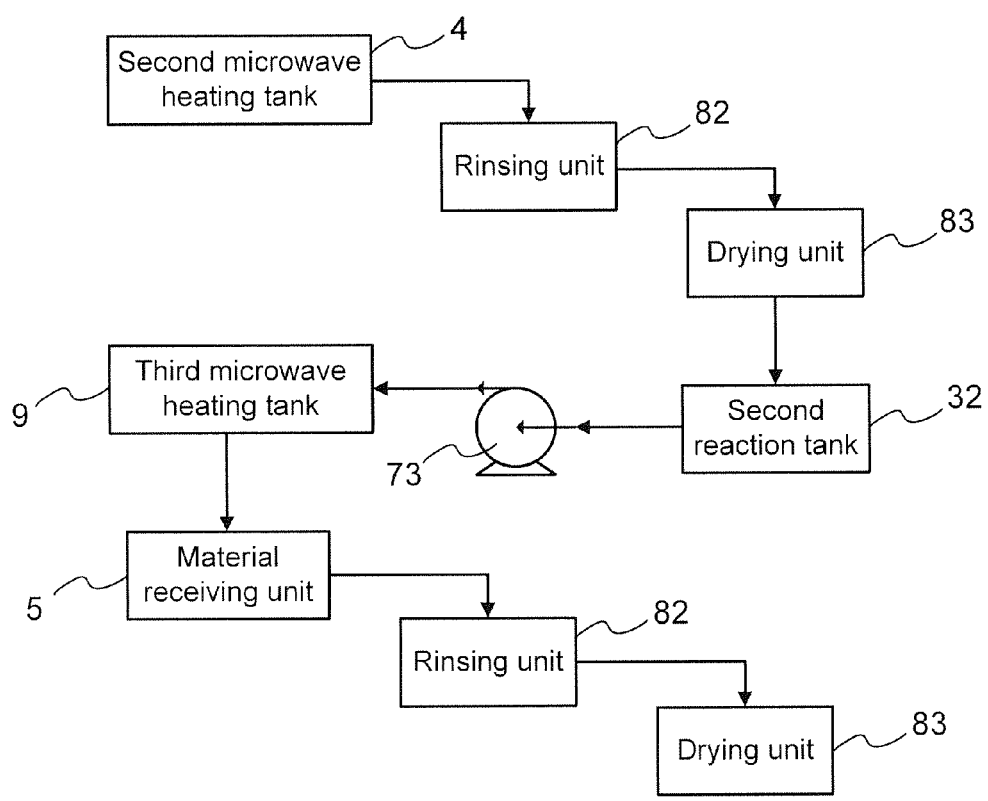
FIG. 4 is a schematic view of the installation positions of a rinsing unit and a drying unit of the present invention.

In FIG. 4, the present invention further comprises a rinsing unit 82 and a drying unit 83 installed between the second microwave heating tank 4 and the second reaction tank 32 and between the third microwave heating tank 9 and the material receiving unit 5 to assure a high purity of the product. With the rinsing function of the rinsing unit 82 and the filtering and drying functions of the drying unit 83, the oxidized graphene nanoribbon is rinsed by water first and then dried and filtered before a reducing agent is added to conduct the reduction. Finally, the preliminary liquid containing graphene nanoribbon obtained by the material receiving unit 5 stills requires the rinsing, filtering and drying processes before a graphene nanoribbon powder product can be obtained. In these rinsing, filtering, and drying processes, the metal impurities originally existed in the carbon nanotube material can be eliminated step by step.

Based on the hardware structure of the system of the present invention, a microwave processing method is adopted, and the carbon nanotube is used to absorb a large quantity of microwave energy. In addition, the energy of the microwave can cause a dipole rotation of molecules and an ionic conduction of the matter to result in a quick temperature rise, so that the heating time only takes one-tenth of the time required by the traditional heating method by convection to achieve the required chemical reaction effect. The invention not only has the advantage of a shorter reaction time, but also produces graphene nanoribbon with a better quality than the prior art.

In summation of the description above, the present invention discloses a system for manufacturing graphene nanoribbon by continuous microwave. Based on the properties of hardware structure, after the carbon nanotube material is added and processed by a microwave heating process in microwave heating tank, the oxidizing agent or the reducing agent are added into the reaction tank, and the flow rate and flow direction of the pump are controlled to shorten the reaction time and improve the yield and quality significantly, so that the ring of the carbon nanotube can be opened to form a slender graphene nanoribbon. By taking the factors of cost down and improved quality and efficiency into consideration, the present invention undoubtedly provides a system for manufacturing graphene nanoribbon by continuous microwave that is practical and has industrial values.

The invention claimed is:

1. A system for manufacturing graphene nanoribbon by continuous microwave, comprising:
    a feeding unit, for providing a carbon nanotube material including a plurality of carbon nanotubes and an acidic solution, and the carbon nanotubes dissolved in the acidic solution;
    a first material pump, coupled to the feeding unit;
    a first microwave heating tank, coupled to the first material pump, and the first material pump pumping the carbon nanotube material to the first microwave heating tank to conduct microwave heating for conducting surface modification of the carbon nanotubes;
    an oxidation tank, coupled to the first microwave heating tank, configured for adding an oxidizing agent into the acidic solution;
    a second material pump, coupled to the oxidation tank;
    a second microwave heating tank, coupled to the second material pump, and the second material pump pumping the carbon nanotube material heated by the first microwave heating tank and passed through the oxidation tank to the second microwave heating tank to conduct microwave heating to form an oxidized graphene nanoribbon contained in the acidic solution;
    a reduction tank, coupled to the second microwave heating tank, configured for adding a reducing agent into the acidic solution;
    a third material pump, coupled to the reduction tank;
    a third microwave heating tank, coupled to the third material pump, and the third material pump pumping the oxidized graphene nanoribbon heated by the second microwave heating tank and passed through the reduction tank to the third microwave heating tank to conduct microwave heating to form the graphene nanoribbon contained in the acidic solution; and
    a material receiving unit, coupled to the third microwave heating tank, for winding the graphene nanoribbon;
    wherein each of the first microwave heating tank, the second microwave heating tank and the third microwave heating tank has a flow channel with a feed inlet and a material outlet formed at both ends of the flow channel, the feed inlet is disposed on a side of each of the first microwave heating tank, the second microwave heating tank and the third microwave heating tank, the material outlet is disposed on a top surface of each of the first microwave heating tank, the second microwave heating tank and the third microwave heating tank, and the directions of the feed inlets are perpendicular to the material outlets; connection methods between the feeding unit, the first material pump, the first microwave heating tank, the oxidation tank, the second material pump, the second microwave heating tank, the reduction tank, the third material pump, the third microwave heating tank and the material receiving unit are a plurality of delivery pipelines connected with the feeding unit, the first material pump, the first microwave heating tank, the oxidation tank, the second material pump, the second microwave heating tank, the reduction tank, the third material pump, the third microwave heating tank and the material receiving unit; the first material pump pumps the carbon nanotubes dissolved in the acidic solution from the feeding unit to the first microwave heating tank for surface modification of the carbon nanotubes, the second material pump pumps the carbon nanotubes contained in the acidic solution from the oxidation tank to the second microwave heating tank for forming the oxidized graphene nanoribbon, the third material pump pumps the oxidized graphene nanoribbon contained and the reducing agent contained in the acidic solution from the reduction tank to the third microwave heating tank for forming the graphene nanoribbon contained in the acidic solution.

2. The system of claim 1, wherein the oxidizing agent is one selected from the collection of potassium chlorate, sodium chlorate, potassium perchlorate, hydrogen peroxide, and potassium permanganate.

3. The system of claim 1, wherein the reducing agent is dimethyl acetamide.

4. The system of claim 1, wherein the first microwave heating tank, the second microwave heating tank and the third microwave heating tank have a microwave heating reaction temperature of 1~120° C.

5. The system of claim 1, wherein the first microwave heating tank, the second microwave heating tank and the third microwave heating tank have a microwave heating reaction power of 1~3000 W.

6. The system of claim 1, wherein each of the first microwave heating tank, the second microwave heating tank and the third microwave heating tank is separately coupled to a cooling unit.

7. The system of claim 1, further comprising a rinsing unit and a drying unit installed between the second microwave heating tank and the reduction tank.

8. A system for manufacturing graphene nanoribbon by continuous microwave, comprising:
    a feeding unit, for providing a carbon nanotube material including a plurality of carbon nanotubes and an acidic solution, and the carbon nanotubes dissolved in the acidic solution;
    a first material pump, coupled to the feeding unit;
    a first microwave heating tank, coupled to the first pump, and the first material pump pumping the carbon nanotube material to the first microwave heating tank to conduct microwave heating, the first microwave heating tank has a flow channel with a feed inlet and a material outlet formed at both ends of the flow channel, the feed inlet is disposed on a side of the first microwave heating tank, the material outlet is disposed on a top surface of the first microwave heating tank, and the direction of the feed inlet is perpendicular to the material outlet;
    a second material pump, coupled to the first microwave heating tank;
    an oxidation/reduction tank, coupled to the second material pump, and the second material pump pumping the carbon nanotube material heated by the first microwave heating tank and passed through the oxidation/reduction tank twice and added with an oxidizing agent and a reducing agent back into the first microwave heating tank to conduct microwave heating again to form the graphene nanoribbon contained in a liquid; and a material receiving unit, coupled to the first microwave heating tank, for winding the graphene nanoribbon;

wherein connection methods between the feeding unit, the first material pump, the first microwave heating tank, the oxidation/reduction tank, the second material pump and the material receiving unit are a plurality of delivery pipelines connected with the feeding unit, the first material pump, the first microwave heating tank, the oxidation/reduction tank, the second material pump and the material receiving unit; the first material pump pumps the carbon nanotubes contained in the acidic solution from the feeding unit to the first microwave heating tank for surface modification of the carbon nanotubes, the second material pump pumps the carbon nanotubes dissolved in the acidic solution from the first microwave heating tank to the oxidation/reduction tank for adding the oxidizing agent to the acidic solution, the second material pump pumps the carbon nanotubes and the oxidizing agent contained in the acidic solution from the oxidation/reduction tank to the first microwave heating tank for forming the oxidized graphene nanoribbon contained in the liquid, the second material pump pumps the oxidized graphene nanoribbon contained in the acidic solution from the first microwave heating tank to the oxidation/reduction tank for adding the reducing agent, the second material pump pumps the oxidized graphene nanoribbon and the reducing agent contained in the acidic solution from the oxidation/reduction tank to the first microwave heating tank for forming the graphene nanoribbon contained in the acidic solution.

\* \* \* \* \*